US011630954B2

(12) United States Patent
Guo et al.

(10) Patent No.: US 11,630,954 B2
(45) Date of Patent: Apr. 18, 2023

(54) KEYWORD EXTRACTION METHOD, APPARATUS AND MEDIUM

(71) Applicant: Beijing Xiaomi Intelligent Technology Co., Ltd., Beijing (CN)

(72) Inventors: Qun Guo, Beijing (CN); Xiao Lu, Beijing (CN); Erli Meng, Beijing (CN); Bin Wang, Beijing (CN); Liang Shi, Beijing (CN); Hongxu Ji, Beijing (CN); Baoyuan Qi, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 283 days.

(21) Appl. No.: 16/828,938

(22) Filed: Mar. 24, 2020

(65) Prior Publication Data
US 2020/0226367 A1 Jul. 16, 2020

(30) Foreign Application Priority Data
Dec. 13, 2019 (CN) .......................... 201911285835.5

(51) Int. Cl.
*G06F 40/284* (2020.01)
*G06F 40/166* (2020.01)
(Continued)

(52) U.S. Cl.
CPC ........ *G06F 40/284* (2020.01); *G06F 18/2113* (2023.01); *G06F 18/23* (2023.01); *G06F 40/166* (2020.01); *G06V 30/416* (2022.01)

(58) Field of Classification Search
CPC .... G06F 40/166; G06F 40/247; G06F 40/258; G06F 40/289; G06F 40/279;
(Continued)

(56) References Cited

U.S. PATENT DOCUMENTS 7,577,652 B1 * 8/2009 Rajan .................... G06F 16/358
707/999.005
8,166,045 B1 * 4/2012 Mazumdar ............ G06F 16/313
707/748

(Continued)

OTHER PUBLICATIONS

Iwasaki et al., "Topic Extraction Device and Program", published on Sep. 20, 2012, document ID WO=2012124608-A1, p. 18 (Year: 2012).*

(Continued)

*Primary Examiner* — Chau T Nguyen
(74) *Attorney, Agent, or Firm* — Syncoda LLC; Feng Ma

(57) ABSTRACT

A keyword extraction method includes: extracting candidate words from an original document to form a first word set; acquiring a first association degree between each first word thereof and the original document, and determining a second word set according to the first association degree; for each second word in the second word set, inquiring, in a word association topology, at least one node word satisfying a condition of association with the second word and forming a third word set, the word association topology indicating an association relation among multiple node words in a predetermined field; and determining a union set of the second and third word sets, acquiring a second association degree between each candidate keyword in the union set and the original document, and selecting, according to the second association degree, at least one candidate keyword from the union set, to form a keyword set of the original document.

13 Claims, 8 Drawing Sheets

(51) Int. Cl.
*G06V 30/416* (2022.01)
*G06F 18/23* (2023.01)
*G06F 18/2113* (2023.01)

(58) Field of Classification Search
CPC ........ G06F 40/284; G06F 40/30; G06F 16/35; G06F 16/353; G06F 18/2113; G06F 18/23; G06K 9/6218; G06V 30/416
See application file for complete search history.

(56) References Cited

U.S. PATENT DOCUMENTS

| | | | | |
|---|---|---|---|---|
| 11,194,965 | B2* | 12/2021 | Yang | G06F 40/253 |
| 11,281,854 | B2* | 3/2022 | Bohannon | G06F 40/247 |
| 2011/0196670 | A1 | 8/2011 | Dang et al. | |
| 2011/0258196 | A1* | 10/2011 | Lepsoy | G06F 16/3347 |
| | | | | 707/750 |
| 2012/0226696 | A1* | 9/2012 | Thambiratnam | G06F 16/951 |
| | | | | 707/750 |
| 2017/0139899 | A1 | 5/2017 | Zhao | |
| 2019/0026361 | A1* | 1/2019 | Doh | G06F 16/3344 |
| 2019/0163690 | A1 | 5/2019 | Bao | |
| 2020/0043074 | A1* | 2/2020 | Doh | G06Q 30/0639 |
| 2020/0125592 | A1* | 4/2020 | Teruya | G06F 16/328 |
| 2020/0311113 | A1* | 10/2020 | Gao | G06N 20/20 |
| 2021/0174024 | A1* | 6/2021 | Zheng | G06V 30/414 |

OTHER PUBLICATIONS

"Topic Word Selection Method and Topic Structure Recognition Device in Text Recognition", published on Sep. 30, 2002, Document ID: JP-3329353-B2, pp. 11 (Year: 2002).*

Zhang et al., "Method and Device for Extracting the Key Word", published Dec. 3, 2019, Document ID: CN106469187B, pp. 13 (Year: 2019).*

Extended European Search Report (EESR) in EP20166998.3 dated Jul. 1, 2021.

Gupta Ashlesha et al: "A novel statistical and linguistic features based technique for keyword extraction", 2014 International Conference on Information Systems and Computer Networks (ISCON), IEEE, Mar. 1, 2014, pp. 55-59 XP032690103.

* cited by examiner

KEYWORD EXTRACTION METHOD, APPARATUS AND MEDIUM

CROSS-REFERENCE TO RELATED APPLICATION

The present application claims priority to Chinese Patent Application No. 201911285835.5 filed on Dec. 13, 2019, the disclosure of which is hereby incorporated by reference in its entirety.

BACKGROUND

With the explosive growth of textual data in the Internet, in related services, it is often necessary to extract keywords capable of generalizing the core ideas of the articles, to realize functions such as accurate recommendation, key labeling, etc.

SUMMARY

The present disclosure relates generally to the technical field of data processing, and more specifically to a keyword extraction method, apparatus and medium.

Various embodiments of the present disclosure provide a keyword extraction method, an apparatus, and a medium.

In accordance with a first aspect of the embodiments of the present disclosure, a keyword extraction method is provided, comprising steps of:

receiving an original document;

extracting candidate words from the original document, the extracted candidate words forming a first word set;

acquiring a first association degree between each first word in the first word set and the original document, and determining a second word set according to the first association degree, the second word set being a subset of the first word set;

for each second word in the second word set, inquiring, in a word association topology, at least one node word satisfying a condition of association with the second word, the at least one node word forming a third word set, the word association topology indicating an association relation among multiple node words in a predetermined field; and determining a union set of the second word set and the third word set, acquiring a second association degree between each candidate keyword in the union set and the original document, and selecting, according to the second association degree, at least one candidate keyword from the union set, to form a keyword set of the original document.

In another implementation, the extracting candidate words from the original document comprises:

extracting, according to a candidate word extraction rule, nominal words or nominal phrases from the original document as candidate words, each of the nominal phrases being combined by a modifying word and a nominal word;

wherein the candidate word extraction rule is a rule determined according to at least one of the following: the number of contained characters, a frequency of occurrence, and a frequency of occurrence of synonyms.

In another implementation, the method further comprises:

extracting, from the original document, verbal, nominal or adjective words to form a denoised document;

calculating a document feature vector of the denoised document by using a vector generation model; and selecting, from the denoised document, nominal words or nominal phrases to form a to-be-clustered word set, acquiring a word feature vector of each to-be-clustered word in the to-be-clustered word set, clustering the to-be-clustered word set according to the word feature vector, and determining multiple cluster sets of the original document, each of the nominal phrases being combined by a modifying word and a nominal word.

In another implementation, the acquiring a first association degree between each first word in the first word set and the original document comprises:

calculating, according to the document feature vector and the multiple cluster set as well as the word feature vector of each first word in the first word set, a first association degree between each first word and the original document; and the acquiring a second association degree between each candidate keyword in the union set and the original document comprises:

calculating, according to the document feature vector and the multiple cluster set as well as the word feature vector of each candidate keyword in the union set, a second association degree between each candidate keyword and the original document.

In another implementation, the first association degree between each first word and the original document or the second association degree between each candidate keyword and the original document is calculated according to the following formula:

$$S(x, D) = \alpha \cdot Y_{sim}(x, V_0) + \beta \cdot \frac{\sum_{i=1}^{M} Y_{sim}(x, C_i)}{M},$$

where x represents the word feature vector of any first word in the first word set or the word feature vector of any candidate keyword in the union set, S(x, D) represents the first association degree between any first word in the first word set and the original document or the second association degree between any candidate keyword in the union set and the original document, $\alpha$ and $\beta$ are weight coefficients, $Y_{sim}$ ( ) is a similarity function, $V_0$ is the document feature vector, $C_i$ is a cluster feature vector of the $i^{th}$ cluster set, and M is a number of the cluster sets.

In another implementation, the determining a second word set according to the first association degree comprises:

selecting first words each of which has a first association degree with the original document being greater than a first preset association value, to form the second word set;

or, selecting, in a descending order for first association degrees with the original document, first words preceding a first preset rank, to form the second word set;

or, selecting, in a descending order for first association degrees with the original document, first words located in a first preset proportion part of the order to form the second word set.

In another implementation, the inquiring, the inquiring, for each second word in the second word set and in a word association topology, at least one node word satisfying a condition of association with the second word comprises:

when the word association topology is an undirected topology, inquiring, in the word association topology, a node word having an association distance to a second word in the second word set being less than a preset distance; and when the word association topology is a directed topology, inquiring, in the word association topology, a node word having an association distance to a second word in the second word set being within a preset range, the preset range comprising a positive interval and a negative interval.

In another implementation, the selecting, according to the second association degree and from the union set, at least one candidate keyword to form a keyword set of the original document comprises:

multiplying association degrees between some candidate keywords, from the third word set, in the union set with the original document by a preset coefficient, the preset coefficient being greater than 0.7 and less than 1; and selecting, from the union set, the at least one keyword in at least one of the following ways:

selecting candidate keywords having the second association degree being greater than a second preset association value;

or, selecting, in a descending order for the second association degrees, candidate keywords preceding second preset rank;

or, selecting, in a descending order for the second association degrees, candidate keywords located in a first second preset proportion part of the order.

In accordance with a second aspect of the embodiments of the present disclosure, a keyword extraction apparatus is provided, comprising:

a processor; and a memory configured to store instructions executable for the processor that, when executed by the processor, causes the processor to:

receive an original document;

extract candidate words from the original document and form a first word set by using the extracted candidate words;

acquire a first association degree between each first word in the first word set and the original document;

determine a second word set according to the first association degree, the second word set being a subset of the first word set;

for each second word in the second word set, inquire, in a word association topology, at least one node word satisfying a condition of association with the second word, and form a third word set by using the at least one node word, the word association topology indicating an association relation among multiple node words in a predetermined field;

determine a union set of the second word set and the third word set;

acquire a second association degree between each candidate keyword in the union set and the original document; and select, according to the second association degree and from the union set, at least one candidate keyword to form a keyword set of the original document.

In another implementation, the instructions further cause the processor to:

extract, according to a candidate word extraction rule and from the original document, nominal words or nominal phrases combined by modifying words and nominal words as candidate words;

wherein the candidate word extraction rule is a rule determined according to at least one of the following: the number of contained characters, a frequency of occurrence, and a frequency of occurrence of synonyms.

In another implementation, the instruction further causes the processor to:

extract, from the original document, verbal, nominal or adjective words to form a denoised document;

calculate a document feature vector of the denoised document by using a vector generation model; and select, from the denoised document, nominal words or nominal phrases combined by modifying words and nominal words to form a to-be-clustered word set, acquire a word feature vector of each to-be-clustered word in the to-be-clustered word set, cluster the to-be-clustered word set according to the word feature vector, and determine multiple cluster sets of the original document.

In another implementation, the instruction further causes the processor to:

calculate, according to the document feature vector and the multiple cluster set as well as the word feature vector of each first word in the first word set, a first association degree between each first word and the original document; and calculate, according to the document feature vector and the multiple cluster set as well as the word feature vector of each candidate keyword in the union set, a second association degree between each candidate keyword and the original document.

In another implementation, the instruction further causes the processor to calculate the first association degree between each first word and the original document according to the following formula, and calculate the second association degree between each candidate keyword and the original document according to the following formula:

$$S(x, D) = \alpha \cdot Y_{sim}(x, V_0) + \beta \cdot \frac{\sum_{i=1}^{M} Y_{sim}(x, C_i)}{M}$$

where x represents the word feature vector of any first word in the first word set or the word feature vector of any candidate keyword in the union set, $S(x, D)$ represents the first association degree between any first word in the first word set and the original document or the second association degree between any candidate keyword in the union set and the original document, $\alpha$ and $\beta$ are weight coefficients, $Y_{sim}$( ) is a similarity function, $V_0$ is the document feature vector, $C_i$ is a cluster feature vector of the $i^{th}$ cluster set, and M is a number of the cluster sets.

In another implementation, the instruction further causes the processor to:

select first words having a first association degree with the original document being greater than a first preset association value to form the second word set;

or, select, in a descending order for first association degrees with the original document, first words preceding a first preset rank to form the second word set;

or, select, in a descending order for first association degrees with the original document, first words located in a first preset proportion part of the order to form the second word set.

In another implementation, the instruction further causes the processor to:

when the word association topology is an undirected topology, inquire, in the word association topology, a node word having an association distance to a second word in the second word set being less than a preset distance; and when the word association topology is a directed topology, inquire, in the word association topology, a node word having an association distance to a second word in the second word set being within a preset range, the preset range comprising an positive interval and a negative interval.

In another implementation, the instruction further causes the processor to:

multiply association degrees between some candidate keywords, from the third word set, in the union set with the original document by a preset coefficient, the preset coefficient being greater than 0.7 and less than 1; and select candidate keywords having the second association degree being greater than a second preset association value; or, select, in a descending order for the second association degrees, candidate keywords preceding a second preset rank; or, select, in a descending order for the second association degrees, candidate keywords located in a first second preset proportion part of the order.

In accordance with a third aspect of the embodiments of the present disclosure, a non-temporary computer-readable storage medium is provided, instructions in the storage medium, when executed by a processor of a mobile terminal, enabling the mobile terminal to execute a keyword extraction method, the method comprising operations of:

receiving an original document;

extracting candidate words from the original document, the extracted candidate words forming a first word set;

acquiring a first association degree between each first word in the first word set and the original document, and determining a second word set according to the first association degree, the second word set being a subset of the first word set;

for each second word in the second word set, inquiring, in a word association topology, at least one node word satisfying a condition of association with the second word, and forming a third word set by using the at least one node word, the word association topology indicating an association relation among multiple node words in a predetermined field; and determining a union set of the second word set and the third word set, acquiring a second association degree between each candidate keyword in the union set and the original document, and selecting, according to the second association degree and from the union set, at least one candidate keyword to form a keyword set of the original document.

It should be understood that the foregoing general description and the following detailed description are merely exemplary and explanatory, and not intended to limit the present disclosure.

BRIEF DESCRIPTION OF THE DRAWINGS

The accompanying drawings to be described herein are incorporated into this disclosure and constitute a part of this disclosure. These accompanying drawings show the embodiments of the present disclosure, and are used with this specification to explain the principle of the present disclosure.

DETAILED DESCRIPTION

Descriptions will now be made in detail with respect to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiment do not represent all implementations consistent with the present disclosure. Instead, they are merely examples of apparatuses and methods consistent with aspects related to the disclosure as recited in the appended claims.

Standards of typical keyword extraction services are highly subjective during execution, and it is difficult to obtain available labeled corpora. Many methods are therefore low in accuracy and very time-consuming in calculation.

A first method is typically to extract keywords (for words that have appeared in the article). A second method is typically to generate keywords (for words that have not appeared in the article).

The keyword extraction in the first method is implemented in multiple ways, specifically including: a statistics-based way, a graph-based way and a sequence labeling based way. The statistics-based way is highly dependent on the design of statistical features by experts, and time complexity of the graph-based way is generally high (generally above $O(n^2)$). The two ways have a common disadvantage that the sematic association between the selected keyword and the text cannot be ensured and it is inclined to use a frequent word as a keyword. The sequence labeling based way is a supervised approach which is dependent on the labeled corpora and only applicable to tasks in the corpus training field.

The keyword generation in the method 2 is also implemented in multiple ways, specifically including: a translation alignment based way and a sequence-to-sequence (seq2seq) based way. The two ways are dependent on a large amount of labeled corpora, high in calculation complexity and only applicable in the corpus training field.

Typical keyword extraction methods may have the following disadvantages.

The accuracy and coverage rate are low. The methods based on statistical features and graph random walk cannot ensure the sematic association between the extracted keyword and the article, particularly in a case where the article has multiple topics.

The graph-based or supervised methods are high in calculation complexity, especially in a long article.

During the keyword extraction, it is more inclined to extract high-frequency common words, but the high-frequency words are not necessarily applicable to generalize the semantics of the article.

The methods cannot be combined with a knowledge system in an external field such as knowledge/label maps to generate keywords beyond the text, thus limiting the semantic generalization capability.

Figure 1:
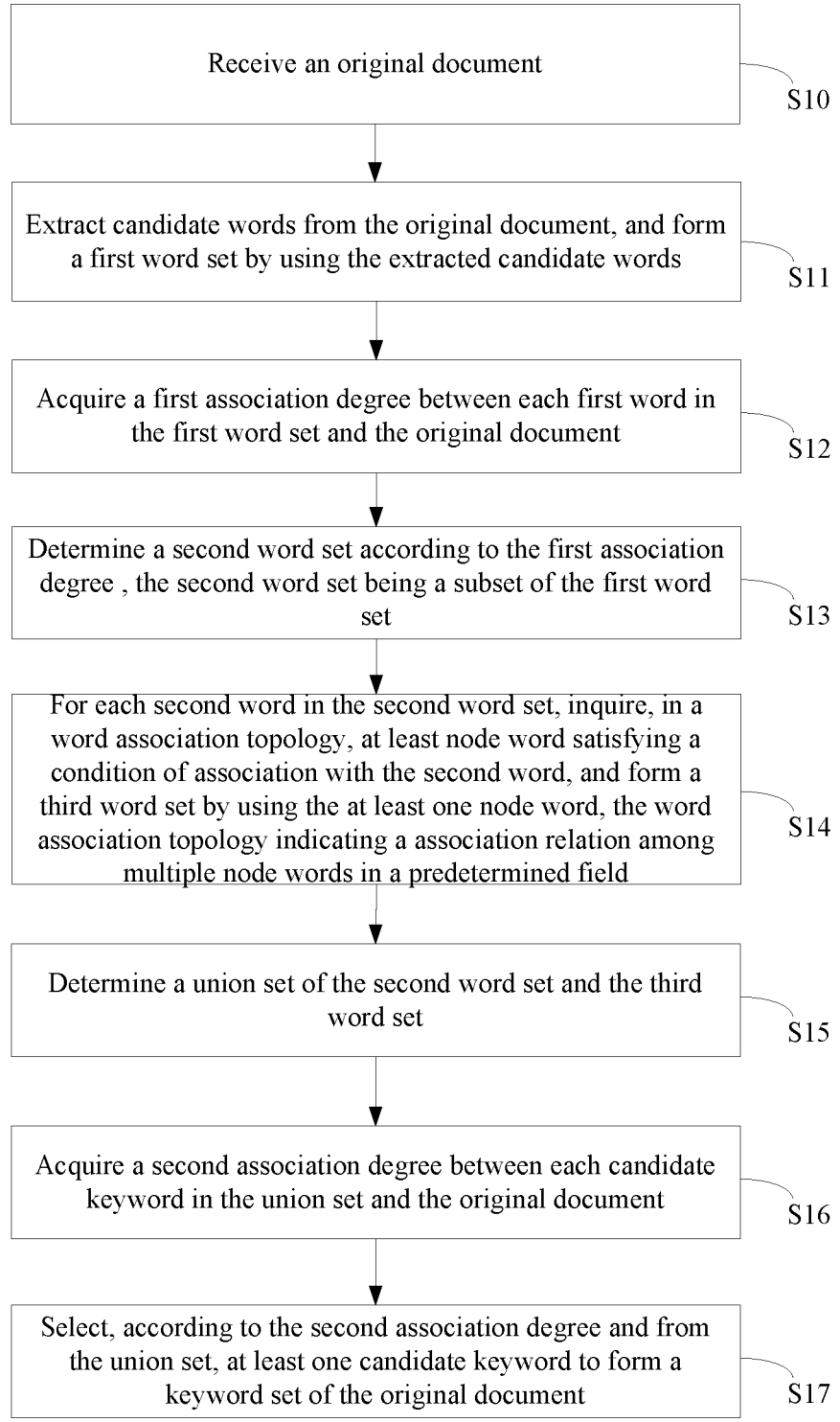
FIG. 1 is a flowchart of a keyword extraction method according to some embodiments.

An embodiment of the present disclosure provides a keyword extraction method. FIG. 1 is a flowchart of a keyword extraction method according to some embodiments. As shown in FIG. 1, the method includes the following operations.

Step S10: An original document is received.

Step S11: Candidate words are extracted from the original document, and a first word set is formed by using the extracted candidate words.

Step S12: A first association degree between each first word in the first word set and the original document is acquired.

Step S13: A second word set is determined according to the first association degree, the second word set being a subset of the first word set.

Step S14: For each second word in the second word set, at least one node word satisfying a condition of association with the second word is inquired in a word association topology, and a third word set is formed by using the at least one node word, the word association topology indicating an association relation among multiple node words in a predetermined field.

Step S15: A union set of the second word set and the third word set is determined.

Step S16: A second association degree between each candidate keyword in the union set and the original document is acquired.

Step S17: At least one candidate keyword is selected from the union set according to the second association degree to form a keyword set of the original document.

This method can be run on a mobile terminal (e.g., a mobile phone), or may be run on a network-side device (e.g., a server, a processing center, etc.).

In another embodiment, the method shown in FIG. 1 further includes a step S18: outputting the keyword set of the original document. The outputting includes at least one of the following ways: transmitting the keyword set of the original document from a mobile terminal to another mobile terminal, transmitting the keyword set of the original document from a network-side device to a mobile terminal, transmitting the keyword set of the original document from a mobile terminal to a network-side device, displaying the keyword set of the original document on a display device, and playing the keyword set of the original document on a playback device.

Figure 2:
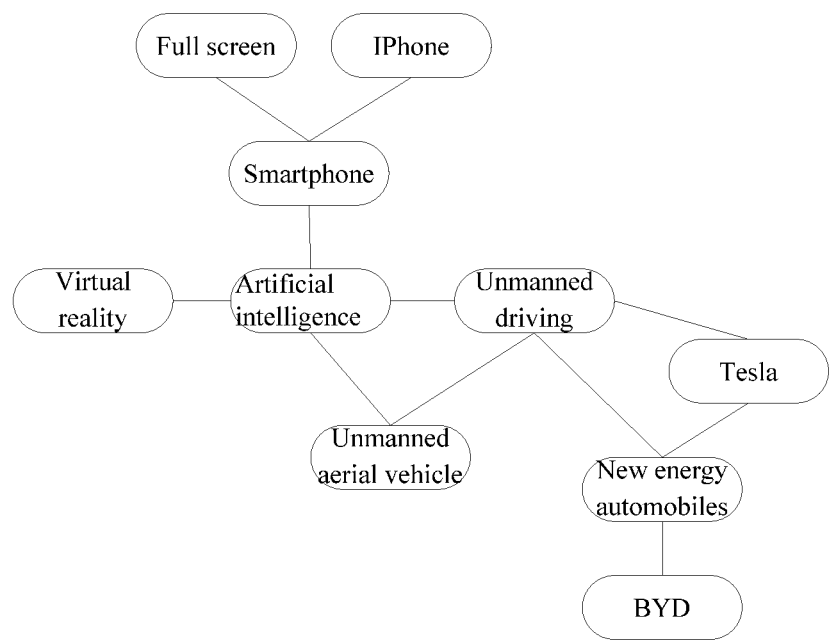
FIG. 2 is a schematic view of a word association topology according to some embodiments.

The word association topology in the step S14 includes multiple nodes. each node corresponds to a word, and the connection mode between nodes indicates the association between corresponding words. The word association topology is an undirected topology or a directed topology. The connection relation between two adjacent nodes (i.e., directly connected nodes) may be an unweighted connection relation, that is, the connection distance between adjacent nodes is a preset distance (e.g., 1). The connection relation between two adjacent nodes (i.e., directly connected nodes) may also be a weighted connection relation. For example, if the connection weight between adjacent nodes is 0.8, the connection distance between adjacent nodes is a product (i.e., 0.8) of the preset distance (e.g., 1) and the connection weight (0.8). FIG. 2 is a structure diagram of a simple undirected word association topology used in an example. As shown in FIG. 2, the connection relation between adjacent nodes in this figure may be an unweighted connection relation or a weighted connection relation.

In this method, by only using an existing word association topology or manually constructing a word association topology, keywords of an original document are selected from candidate words of the original document and node words in the word association topology satisfying a condition of association with the candidate words. This method has a calculation complexity of O(n), and can obviously improve the calculation speed in comparison to the complexity $O(n^2)$ of in the existing methods. This method may not be influenced by the frequency of candidate words by means of introducing the word association topology, so that the problem of preferentially selecting high-frequency words in the existing methods is solved. In this method, the effect of effectively utilizing external knowledge is achieved by the word association topology, and the words that can express the original idea of the original document and can be beyond the contents of the original document are provided, so that the expression of keywords is effectively enriched.

For example, the original document is a document that introduces the Long Short-Term Memory (LSTM) network. The whole article focuses on the specific discussion of the LSTM, and there are no words such as "neural network" and "artificial intelligence". However, the keywords finally selected by this method include the words such as "neural network" and "artificial intelligence" in the word association topology. Although these words do not appear in the original document, the gist of the original document can be embodied by these words in different levels.

An embodiment of the present disclosure further provides a keyword extraction method. In this embodiment, in the S11 shown in FIG. 1, the extracting candidate words from the original document includes: extracting, according to a candidate word extraction rule and from the original document, nominal words or nominal phrases combined by modifying words and nominal words as candidate words.

The part of speed of the modifying words is adjectives, nouns or words of other parts of speech that can modify nouns. For example, MOBILE PHONE is a nominal word, and FOLDABLE MOBILE PHONE is a nominal phrase, wherein FOLDABLE is an adjective modifying word. This nominal phrase is a phrase combined by an adjective modifying word and a nominal word. For another example, MOBILE PHONE is a nominal word, and MOBILE PHONE WITH CURVED SCREEN is a nominal phrase, wherein curved screen is a nominal modifying word. This nominal phrase is a phrase combined by a nominal modifying word and a nominal word.

The extracting nominal words or nominal phrases from the original document include one of the following two approaches.

First approach: Manual part-of-speech labeling is performed on the original document, and nominal words or nominal phrases are extracted, from the document subjected to the part-of-speech labeling, as candidate words. During the manual part-of-speech labeling, the corresponding parts of speed of all words are labeled, or only nominal words and modifying words are labeled.

Second approach: Part-of-speech labeling is performed on the original document by part-of-speech labeling software. Nominal words or nominal phrases are extracted, from the document subjected to the part-of-speech labeling, as candidate words. During the labeling by the part-of-speech labeling software, a range of parts of speech to be labeled is set. This range may be set to include all parts of speech, or may be set to include nominal words and modifying words.

The candidate word extraction rule is a rule determined according to at least one of the following: the number of contained characters or words, the frequency of occurrence, and the frequency of occurrence of synonyms.

In this method, multiple parameters are set in the candidate word extraction rule. In addition to the frequency of occurrence (i.e., the frequency of occurrence of a same word), the multiple parameters further involve the number of contained characters or words and parameters related to synonym concept, so that the extracted candidate words are not only words having a single characteristic of the most frequent or more frequent words, but also more diversified and multi-aspect candidate words considering the synonym concept. The candidate words selected by this method are words that can better reflect the gist of the article in comparison to the candidate words selected by the prior art.

Figure 3:
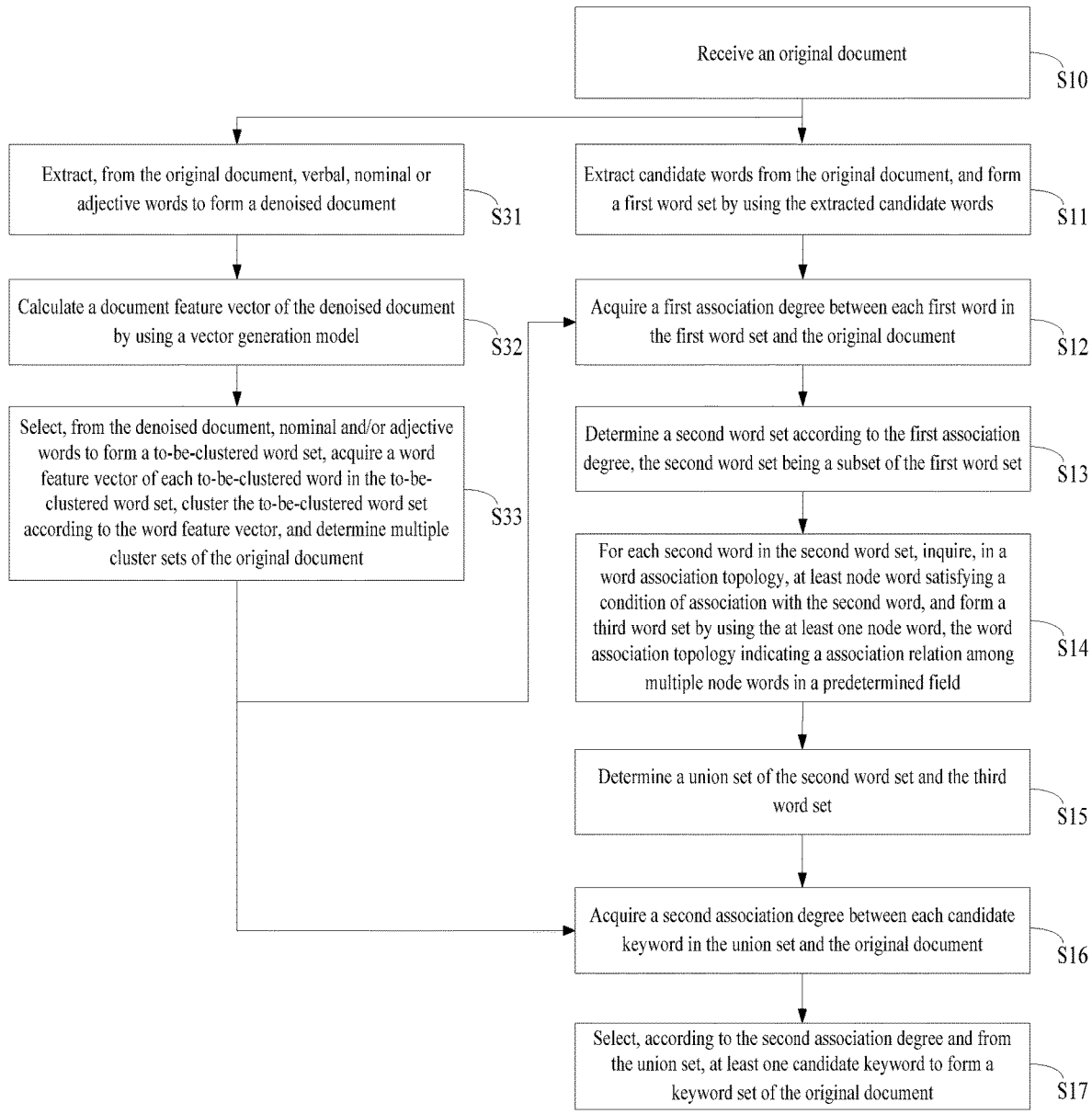
FIG. 3 is a flowchart of a keyword extraction method according to some embodiments.

An embodiment of the present disclosure further provides a keyword extraction method. FIG. 3 is a flowchart of a keyword extraction method according to some embodiments. Based on the method shown in FIG. 1, this method further includes the following operations.

Step S31: Verbal, nominal or adjective words are extracted from the original document to form a denoised document.

Step S32: A document feature vector of the denoised document is calculated by using a vector generation model.

Step S33: Nominal words or nominal phrases combined by modifying words and nominal words are selected from the denoised document to form a to-be-clustered word set, a word feature vector of each to-be-clustered word in the to-be-clustered word set is acquired, the to-be-clustered word set is clustered according to the word feature vector, and multiple cluster sets of the original document are determined. The clustering methods include various methods: for example, K-means clustering method, mean shift clustering method, density-based clustering method, Expectation Maximum (EM) clustering method using a Gaussian Mixture Model (GMM), agglomerative hierarchical clustering method, and graph group detection clustering method. Before clustering, the number of target cluster centers may be set in advance (e.g., set as 3). In the process of setting the number of target cluster centers, the number of target cluster centers is set according to the number of characters in a document to be clustered. If there are more characters, the number of target cluster centers is set to be larger. Similar effects can be achieved by the above clustering methods that can provide cluster centers. The K-mean clustering method has the advantages of stable effect and low time complexity in implementation, and can specify the number of clusters to be clustered.

In the step S32, the calculating a document feature vector of the denoised document by using a vector generation model includes one of the following ways.

First approach: A document feature vector of the denoised document is calculated by using a sentence-to-vector conversion model. For example, the sentence-to-vector conversion model is a sent2vec model.

Second approach: A word feature vector of each word in the denoised document is calculated by a word-to-vector conversion model, an average value of the word feature vectors of all the words in the denoised document is calculated as a document feature vector of the denoised document. For example, the word-to-vector conversion model is a word2vec model.

In an implementation, in the first approach, the step of calculating a document feature vector of the denoised document by using a sentence-to-vector conversion model includes a preparation stage and a training stage. Specifically:

In the preparation stage, a corpus related to the field of the original document is prepared, and the number of words in the corpus is greater than a preset number (e.g., an unlabeled corpus with more than 1 million sentences). The language type of this corpus is the same as that of the original document. For example, when the original document is Chinese, the prepared corpus is also Chinese. That is, when the original document is English, the prepared corpus is also English. The corpus is generally an unlabeled corpus. It is required that this corpus contains all the words in the word association topology, and the number of occurrences of each word of the word association topology in this corpus is not less than the preset number (e.g., 50). When the sentence-to-vector conversion model is an existing software, relevant systems and model software are installed, for example, python3.5 and sent2vec tool software.

In the training stage, the corpus is trained by the model software. The specific process of the training stage using sent2vec tool software will be illustrated below.

Step 1: The prepared corpus is cleaned to ensure that each sentence in the cleaned corpus is a natural language sentence with correct grammar and clear semantics. The specific cleaning method is to remove special characters, programming languages (e.g., html statements) and other parts that cannot effectively express the gist of the corpus.

Step 2: The cleaned corpus is segmented into sentences, and each sentence are separated by a first preset symbol (e.g., line break).

Step 3: Each sentence in the segmented corpus is segmented into words, and each word are separated by a second preset symbol (e.g., space). During word segmentation, the word segmentation may be performed by an open source software, and the weight of each word in the word association topology may also be strengthened.

Step 4: The content of the corpus subjected to the word segmentation is encoded in an utf-8 encoding format and then stored in a document in a .txt format.

Step 5: It is ensured that the computer has an internal memory more than 16 G to run the sent2vec tool software. Relevant parameters required for software operation are set. For example, the settings are as follows: the minimum number of occurrences (minCount) of words in the corpus is 10; the dimension (dim) of word or document vectors is 500; the maximum number of compound words (wordNgrams) is 2, where the compound word refers that two common words connected together is used as one word; the number of negative samples (neg) in the training process is 10; the number of randomly deactivated words (dropoutK) in the training process is 4; the number of cached words (bucket) in the training process is 1000000; and the maximum number of words (maxVocabSize) retained by the sent2vec model is 500000.

Step 5: The document in the .txt format is loaded, and the sent2vec model is trained by using the corpus subjected to the word segmentation. The sent2vec model trained successfully is saved in a .bin format after it is trained successfully.

In the step S12 shown in FIG. 1, the acquiring a first association degree between each first word in the first word set and the original document includes: calculating, according to the document feature vector and the multiple cluster set as well as the word feature vector of each first word in the first word set, a first association degree between each first word and the original document.

In the step S17 shown in FIG. 1, the acquiring a second association degree between each candidate keyword in the union set and the original document includes: calculating, according to the document feature vector and the multiple cluster set as well as the word feature vector of each candidate keyword in the union set, a second association degree between each candidate keyword and the original document.

There are many methods to calculate an association degree between a word and a document, for example, Term Frequency-Inverse Document Frequency (TF-IDF) algorithm, Latent Semantic Indexing (LSI) algorithm, Word Mover's Distance (WMD) algorithm or the like.

An embodiment of the present disclosure provides a new method for calculating an association degree between a word and a document. Specifically:

In the step S12, the first association degree between each first word and the original document is calculated by the following formula (1):

$$S(x, D) = \alpha \cdot Y_{sim}(x, V_0) + \beta \cdot \frac{\sum_{i=1}^{M} Y_{sim}(x, C_i)}{M} \quad (1)$$

In the formula (1), x represents the word feature vector of any first word in the first word set, S(x, D) represents the first association degree between any first word in the first word set and the original document, α and β are weight coefficients, $Y_{sim}()$ is a similarity function, $V_0$ is the document feature vector, $C_i$ is a cluster feature vector of the $i^{th}$ cluster set, and M is the number of the cluster sets.

The similarity function may be any function that can represent the similarity of two vectors. For example, the similarity function is a cosine similarity function, a Euclidean distance, a Manhattan distance, a Chebyshev distance, a Minkowski distance, a Hamming distance, a Jaccard distance or the like.

In the step S17, the second association degree between each candidate keyword and the original document is calculated by the formula (1). In the formula (1), x represents the word feature vector of any candidate keyword in the union set, S(x, D) represents the second association degree between the word feature vector of any candidate keyword in the union set and the original document, α and β are weight coefficients, $Y_{sim}()$ is a similarity function, $V_0$ is the document feature vector, $C_i$ is a cluster feature vector of the $i^{th}$ cluster set, and M is the number of the cluster sets.

The formula (1) may be used to calculate the association degree between a word in any word set and a document. The method for calculating the association degree between a word and a document by the formula (1) is implemented on the basis of using the sent2vec model and the clustering processing. A vector representation in a document or sentence level is optimized based on the sent2vec model, and effective classification is realized by clustering, so that words can be better mapped into a same semantic space. The association degree between a word and a document can be represented more accurately and effectively by using the formula (1) and in combination with the association degree between the word and the document feature vector and the association degree between the word and the cluster feature vector.

An embodiment of the present disclosure further provides a keyword extraction method. In this method, in the step S13 shown in FIG. 1, the determining a second word set according to the first association degree includes one of the following ways.

First approach: First words having a first association degree with the original document being greater than a first preset association value are selected to form the second word set. For example, if the first preset association value is 80%, first words having a first association degree greater than the first preset association value are selected.

Second approach: In a descending order for first association degrees with the original document, first words preceding a first preset rank are selected to form the second word set. For example, if the first preset rank is the sixth rank in the order, and when there are totally 30 ranks included in the descending order of first association degrees with the original document, first words having a first association degree with the original document at the first five ranks are selected.

Third approach: In a descending order for first association degrees with the original document, first words located in a first preset proportion part of the order are selected to form the second word set. For example, if the first preset proportion is 10% in the order, and when there are totally 30 ranks included in the descending order of first association degrees with the original document, first words having a first association degree with the original document at the first three ranks are selected.

An embodiment of the present disclosure further provides a keyword extraction method. In this method, in the step S14 shown FIG. 1, the inquiring, for each second word in the second word set and in a word association topology, at least one node word satisfying a condition of association with the second word includes: when the word association topology is an undirected topology, inquiring, in the word association topology, a node word having an association distance to a second word in the second word set being less than a preset distance; and when the word association topology is a directed topology, inquiring, in the word association topology, a node word having an association distance to a second word in the second word set being within a preset range, the preset range including an positive interval and a negative interval.

An embodiment of the present disclosure further provides a keyword extraction method. In this method, in the step S17 shown in FIG. 1, the selecting, according to the second association degree and from the union set, at least one candidate keyword to form a keyword set of the original document includes:

multiplying association degrees between some candidate keywords, from the third word set, in the union set with the original document by a preset coefficient, the preset coefficient being greater than 0.7 and less than 1; and selecting, from the union set, the at least one keyword by at least one of the following ways.

First approach: Candidate keywords having the second association degree being greater than a second preset association value are selected.

Second approach: In a descending order for the second association degrees, candidate keywords preceding a second preset rank are selected.

Third approach: In a descending order for the second association degrees, candidate keywords located in a first second preset proportion part of the order are selected.

Figure 4:
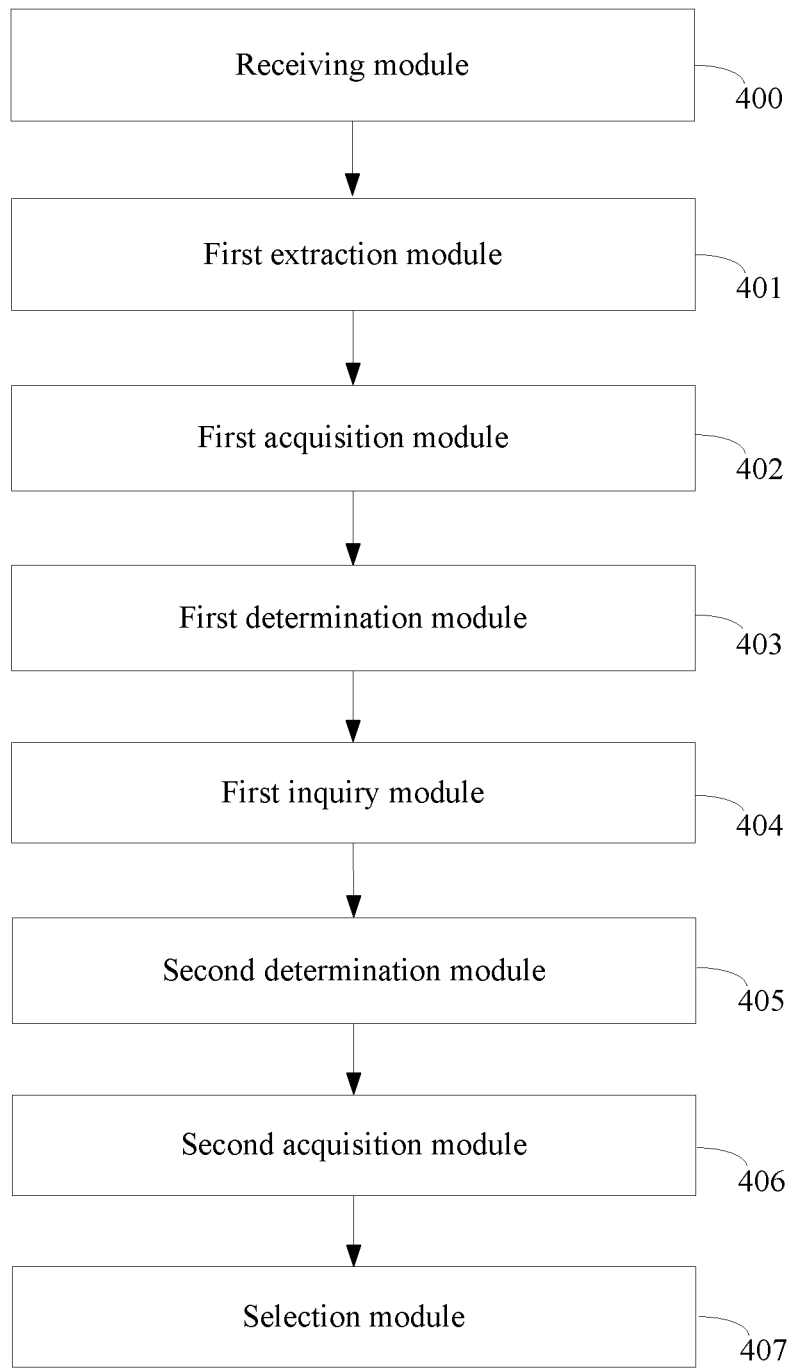
FIG. 4 is a structure diagram of a keyword extraction apparatus according to some embodiments.

An embodiment of the present disclosure further provides a keyword extraction apparatus. FIG. 4 is a structure diagram of a keyword extraction apparatus according to some embodiments. As shown in FIG. 4, the apparatus comprises:

a receiving module 400 configured to receive an original document;

a first extraction module 401 configured to extract candidate words from the original document and form a first word set by using the extracted candidate words;

a first acquisition module 402 configured to acquire a first association degree between each first word in the first word set and the original document;

a first determination module 403 configured to determine a second word set according to the first association degree, the second word set being a subset of the first word set;

a first inquiry module 404 configured to, for each second word in the second word set, inquire, in a word association topology, at least one node word satisfying a condition of association with the second word, and form a third word set by using the at least one node word, the word association topology indicating an association relation among multiple node words in a predetermined field;

a second determination module 405 configured to determine a union set of the second word set and the third word set;

a second acquisition module 406 configured to acquire a second association degree between each candidate keyword in the union set and the original document; and a first selection module 407 configured to select, according to the second association degree and from the union set, at least one candidate keyword to form a keyword set of the original document.

In another embodiment, the apparatus further includes an output module configured to output the keyword set of the original document. The output module may be a transmitting module. When the keyword extraction apparatus is applied in a mobile terminal, the transmitting module is configured to transmit the keyword set of the original document to another mobile terminal or a network-side device; and, when the keyword extraction apparatus is applied in a network-side device, the transmitting module is configured to transmit the keyword of the original document to a mobile terminal. The output module may also be a display device configured to display keyword set of the original document. The output module may also be a playback device configured to play the keyword set of the original document. An embodiment of the present disclosure further provides a keyword extraction apparatus. In this apparatus, the first extraction module 401 in the apparatus shown in FIG. 4 includes:

a second extraction module configured to extract, according to a candidate word extraction rule and from the original document, nominal words or nominal phrases combined by modifying words and nominal words as candidate words;

wherein the candidate word extraction rule is a rule determined according to at least one of the following: the number of contained characters, a frequency of occurrence, and a frequency of occurrence of synonyms.

Figure 5:
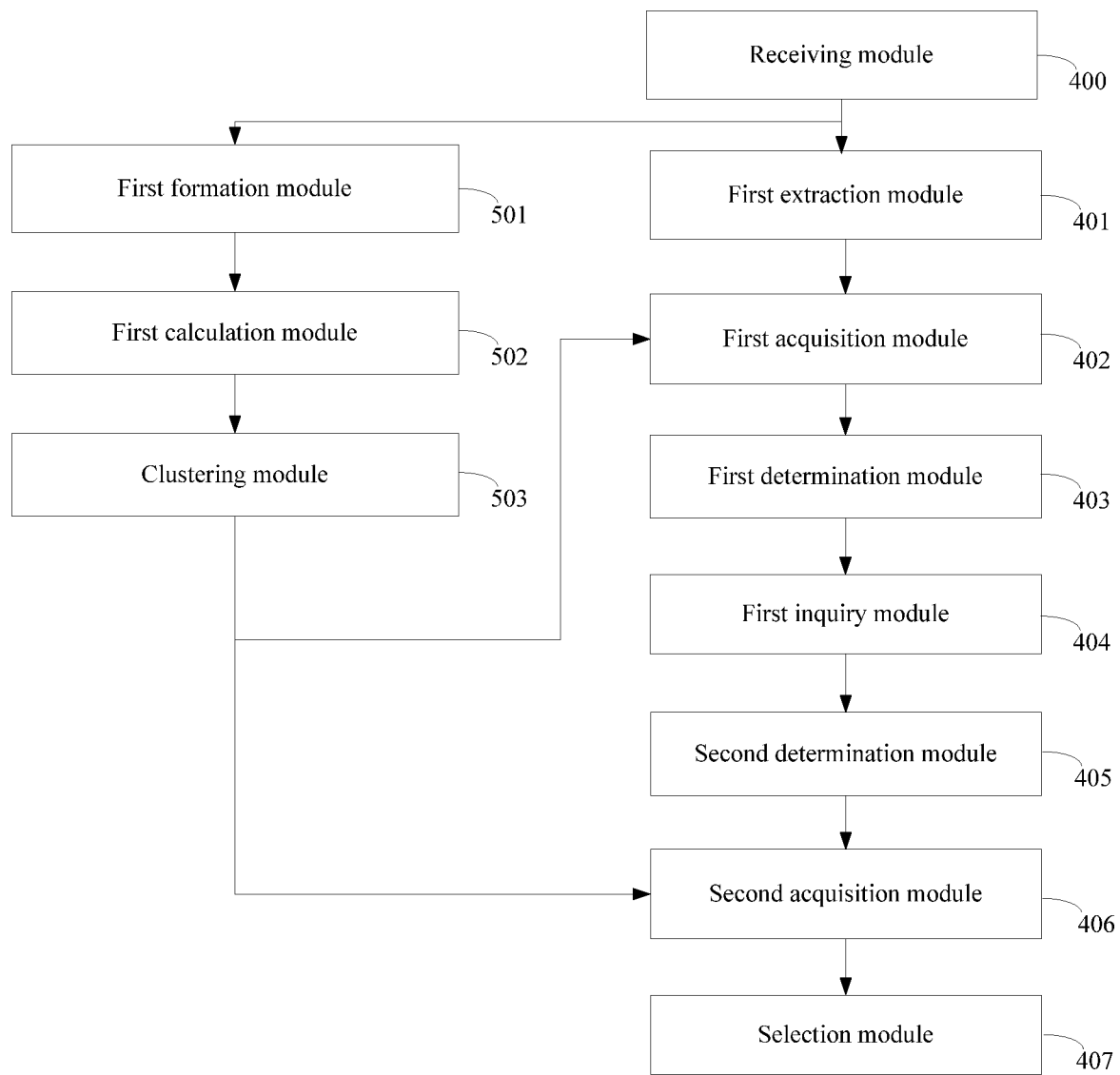
FIG. 5 is a structure diagram of a keyword extraction apparatus according to some embodiments.

An embodiment of the present disclosure further provides a keyword extraction apparatus. FIG. 5 is a structure diagram of a keyword extraction apparatus according to some embodiments. As shown in FIG. 5, based on the apparatus shown in FIG. 4, this apparatus further includes:

a first formation module 501 configured to extract, from the original document, verbal, nominal or adjective words to form a denoised document;

a first calculation module 502 configured to calculate a document feature vector of the denoised document by using a vector generation model; and a clustering module 503 configured to select, from the denoised document, nominal words or nominal phrases combined by modifying words and nominal words to form a to-be-clustered word set, acquire a word feature vector of each to-be-clustered word in the to-be-clustered word set, cluster the to-be-clustered word set according to the word feature vector, and determine multiple cluster sets of the original document.

Figure 6:
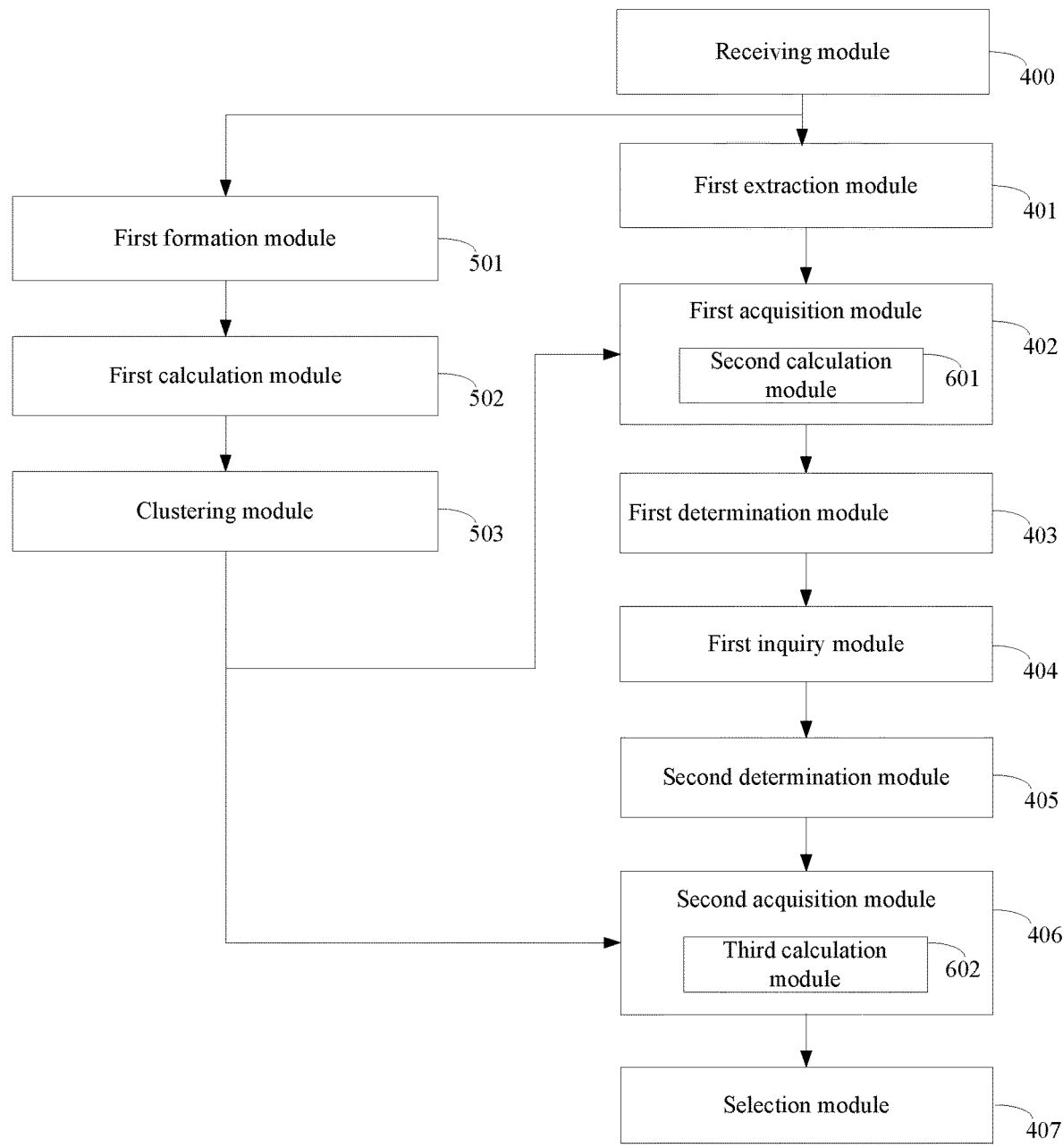
FIG. 6 is a structure diagram of a keyword extraction apparatus according to some embodiments.

An embodiment of the present disclosure further provides a keyword extraction apparatus. FIG. 6 is a structure diagram of a keyword extraction apparatus according to some embodiments. As shown in FIG. 6, based on the apparatus shown in FIG. 5, this apparatus is a new apparatus. In this apparatus, The first acquisition module 402 shown in FIG. 5 includes: a second calculation module 601 configured to calculate, according to the document feature vector and the multiple cluster set as well as the word feature vector of each first word in the first word set, a first association degree between each first word and the original document.

The second acquisition module 406 shown in FIG. 5 includes: a third calculation module 602 configured to calculate, according to the document feature vector and the multiple cluster set as well as the word feature vector of each candidate keyword in the union set, a second association degree between each candidate keyword and the original document.

Wherein, the second calculation module 601 is further configured to calculate the first association degree between each first word and the original document according to the following formula, and the third calculation module 602 is further configured to calculate the second association degree between each candidate keyword and the original document according to the following formula:

$$S(x, D) = \alpha \cdot Y_{sim}(x, V_0) + \beta \cdot \frac{\sum_{i=1}^{M} Y_{sim}(x, C_i)}{M} \quad (1)$$

where x represents the word feature vector of any first word in the first word set or the word feature vector of any candidate keyword in the union set, S(x, D) represents the first association degree between any first word in the first word set and the original document or the second association degree between any candidate keyword in the union set and the original document, $\alpha$ and $\beta$ are weight coefficients, $Y_{sim}$( ) is a similarity function, $V_0$ is the document feature vector, $C_i$ is a cluster feature vector of the $i^{th}$ cluster set, and M is a number of the cluster sets.

An embodiment of the present disclosure further provides a keyword extraction apparatus. In this apparatus, the first determination module 403 in the apparatus shown in FIG. 4 includes:

a second formation module configured to select first words having a first association degree with the original document being greater than a first preset association value to form the second word set;

or, a third formation module configured to select, in a descending order for first association degrees with the original document, first words preceding a first preset rank to form the second word set;

or, a fourth formation module configured to select, in a descending order for first association degrees with the original document, first words located in a first preset proportion part of the order to form the second word set.

An embodiment of the present disclosure further provides a keyword extraction apparatus. In this apparatus, the first inquiry module 404 in the apparatus shown in FIG. 4 includes:

a second inquiry module configured to, when the word association topology is an undirected topology, inquire, in the word association topology, a node word having an association distance to a second word in the second word set being less than a preset distance; and a third inquiry module configured to, when the word association topology is a directed topology, inquire, in the word association topology, a node word having an association distance to a second word in the second word set being within a preset range, the preset range comprising an positive interval and a negative interval.

An embodiment of the present disclosure further provides a keyword extraction apparatus. In this apparatus, the first selection module 407 in the apparatus shown in FIG. 4 includes:

a weighting module configured to multiply association degrees between some candidate keywords, from the third word set, in the union set with the original document by a preset coefficient, the preset coefficient being greater than 0.7 and less than 1; and a second selection module configured to select candidate keywords having the second association degree being greater than a second preset association value;

or, a third selection module configured to select, in a descending order for first association degrees with the original document, first words preceding a first preset rank to form the second word set;

or, a fourth selection module configured to select, in a descending order for first association degrees with the original document, first words located in a first preset proportion part of the order to form the second word set.

An embodiment of the present disclosure further provides a non-temporary computer-readable storage medium, instructions in the storage medium, when executed by a processor of a mobile terminal, enabling the mobile terminal to execute a keyword extraction method, the method including:

receiving an original document;

extracting candidate words from the original document, and forming a first word set by using the extracted candidate words;

acquiring a first association degree between each first word in the first word set and the original document, and determining a second word set according to the first association degree, the second word set being a subset of the first word set;

for each second word in the second word set, inquiring, in a word association topology, at least one node word satisfying a condition of association with the second word, and forming a third word set by using the at least one node word, the word association topology indicating an association relation among multiple node words in a predetermined field; and determining a union set of the second word set and the third word set, acquiring a second association degree between each candidate keyword in the union set and the original document, and selecting, according to the second association degree and from the union set, at least one candidate keyword to form a keyword set of the original document.

Figure 7:
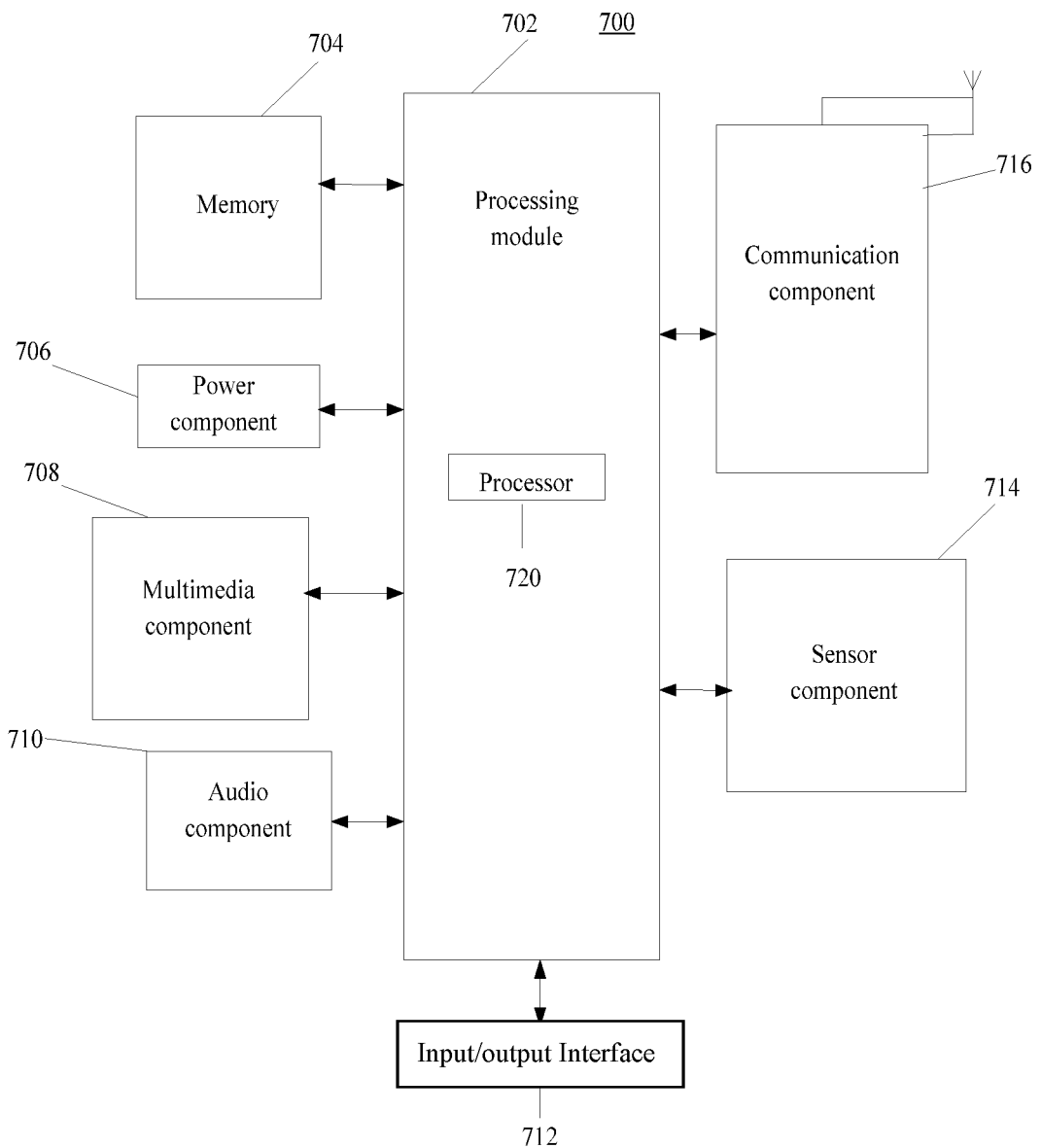
FIG. 7 is a structure diagram of a keyword extraction apparatus according to some embodiments.

FIG. 7 is a block diagram of a keyword extraction apparatus 700 according to some embodiments. For example, the apparatus 700 may be a mobile phone, a computer, a digital broadcasting terminal, a messaging device, a game console, a tablet device, a medical device, a fitness device, a personal digital assistant or the like.

With reference to FIG. 7, the apparatus 700 may include one or more of the following components: a processing component 702, a memory 704, a power component 706, a multimedia component 708, an audio component 710, an input/output (I/O) interface 712, a sensor component 714 and a communication component 716.

The processing component 702 generally controls the overall operation of the apparatus 700, such as operations associated with display, telephone call, data communication, camera operations and recording operations. The processing component 702 may include one or more processors 720 to execute instructions to complete all or some of the operations in the methods described above. Additionally, the processing component 702 may include one or more modules to facilitate interaction between the processing component 702 and other components. For example, the processing component 702 may include a multimedia module to facilitate interaction between the multimedia component 708 and the processing component 702.

The memory 704 is configured to store various types of data to support the operation of the apparatus 700. Examples of the data include instructions for any application or method operating on the apparatus 700, contact data, phonebook data, messages, pictures, video or the like. The memory 704 may be implemented by any type of volatile or non-volatile storage devices or a combination thereof, for example, a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 706 supplies power to various components of the apparatus 700. The power component 706 may include a power management system, one or more power supplies, and other components associated with generating, managing and distributing power for the apparatus 700.

The multimedia component 708 includes a screen to provide an output interface between the apparatus 700 and a user. In some embodiments, the screen may include a Liquid Crystal Display (LCD) and a Touch Panel (TP). In some embodiments, the screen may include an organic light-emitting diode (OLED) display or other types of displays.

If the screen includes a TP, the screen may be implemented as a touch screen to receive input signals from the user. The touch panel includes one or more touch sensors to sense touch, slide and gestures on the touch panel. The touch sensor may sense the boundary of a touch or slide action, and also detect the duration and pressure related to the touch or slide operation. In some embodiments, the multimedia component 708 includes a front camera and/or a rear camera. When the apparatus 700 is in an operation mode such as a shooting mode or a video mode, the front camera and/or the rear camera may receive external multimedia data. Each of the front camera and the rear camera may be a fixed optical lens system or have a focal length and an optical zooming capability.

The audio component 710 is configured to output and/or input audio signals. For example, the audio component 710 includes a microphone (MIC). When the apparatus 700 is in an operation mode such as a call mode, a recording mode or a voice recognition mode, the microphone is configured to receive external audio signals. The received audio signals may be further stored in the memory 704 or transmitted through the communication component 716. In some embodiments, the audio component 710 further includes a loudspeaker configured to output the audio signals.

The I/O interface 712 provides an interface between the processing component 702 and a peripheral interface module. The peripheral interface module may be a keyboard, a click wheel, buttons or the like. These buttons may include, but not limited to: a Home button, a volume button, a start button and a lock button.

The sensor component 714 includes one or more sensors configured to provide state evaluation of various aspects of the apparatus 700. For example, the sensor component 714 may detect the on/off state of the apparatus 700 and the relative position of a component. For example, if the component is a display and a keypad of the apparatus, the sensor component 714 may also detect the position change of the apparatus 700 or one component of the apparatus 700, the presence or absence of the user's contact with the apparatus 700, the orientation or acceleration/deceleration of the apparatus 700 and the temperature change of the apparatus 700. The sensor component 714 may include a proximity sensor configured to detect the presence of nearby objects without any physical contact. The sensor component 714 may further include an optical sensor (e.g., a CMOS or CCD image sensor) for use in imaging applications. In some embodiments, the sensor component 714 may further include an acceleration sensor, a gyroscope sensor, a magnetic sensor, a pressure sensor or a temperature sensor.

The communication component 716 is configured to facilitate the wired or wireless communication between the apparatus 700 and other devices. The apparatus 700 may access to a wireless network based on communication standards, for example, Wi-Fi, 2G, 3G, 4G, 5G, or a combination thereof. In some embodiments, the communication component 716 receives a broadcast signal or broadcast related information from an external broadcast management system via a broadcast channel. In some embodiments, the communication component 716 further includes a Near-Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and other technologies.

In some embodiments, the apparatus 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements to execute the methods described above.

In some embodiments, a non-temporary computer-readable storage medium including instructions is further provided, for example, the memory 704 including instruments. The instruments may be executed by the processor 720 of the apparatus 700 to complete the methods described above. For example, the non-temporary computer-readable storage medium may be an ROM, a Random-Access Memory (RAM), a CD-ROM, a magnetic tape, a floppy disk, an optical data storage device or the like.

Figure 8:
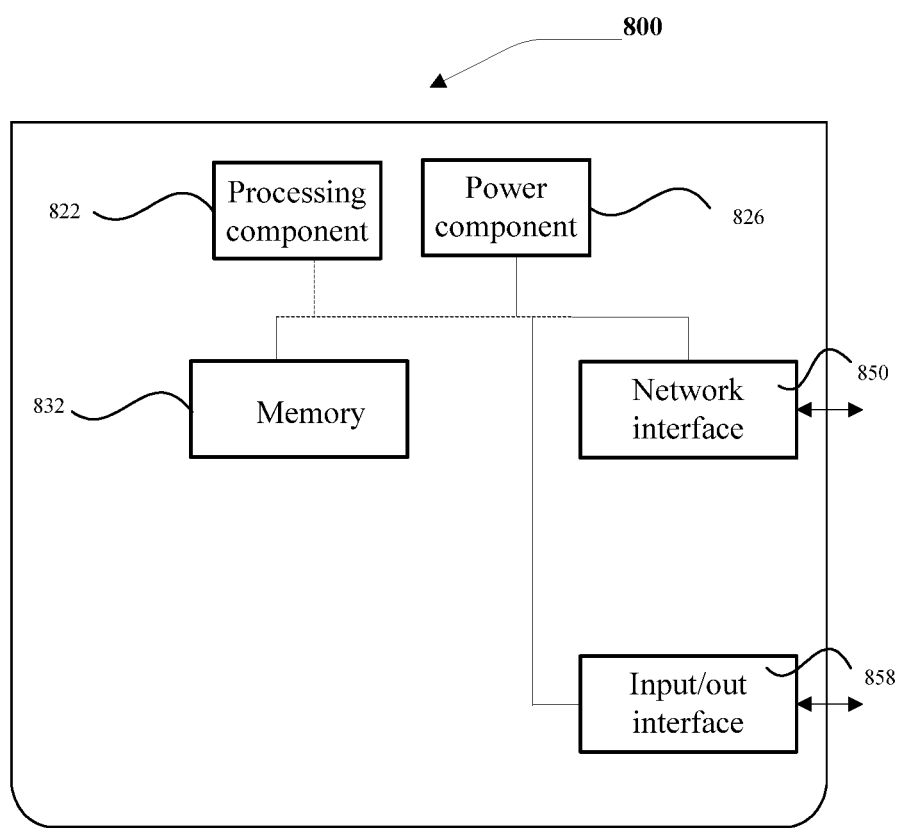
FIG. 8 is a structure diagram of a keyword extraction apparatus according to some embodiments.

FIG. 8 is a block diagram of a keyword extraction apparatus 800 according to some embodiments. For example, the apparatus 800 may be provided as a server. With reference to FIG. 8, the apparatus 800 includes a processing component 822, and further includes one or more processors and memory resources represented by a memory 832 configured to store instructions (such as applications) executable by the processing component 822. The applications stored in the memory 832 may include one or more modules each corresponding to a set of instructions. Additionally, the processing component 822 is configured to execute the instructions to execute the methods described above.

The apparatus 800 may further include a power component 826 configured to execute power management of the apparatus 800, a wired or wireless network interface 850 configured to connect the apparatus 800 to a network, and an input/output (I/O) interface 859. The apparatus 800 may operate an operating system stored in the memory 832, for example, Windows Server™, Mac OS X™, Unix™, Linux™, FreeBSD™ or the like.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Other implementation solutions of the present disclosure will be apparent to those skilled in the art from consideration of the specification and practice of the embodiments of the present disclosure. This disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

In the embodiments of the present disclosure, the feed object of each feed port is changed through a shift function of the radio frequency switch, thereby forming different antenna arrays in different states and extending coverage of the antenna array. Compared with the technical solution that each antenna array includes fixed array elements in the related art, an arraying manner for the antenna array in the embodiment of the present disclosure is more flexible.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A keyword extraction method, run on a mobile terminal or a network-side device, comprising:
receiving an original document;
extracting, from the original document, verbal, nominal or adjective words to form a denoised document;
calculating a document feature vector of the denoised document by using a vector generation model;
selecting, from the denoised document, nominal words or nominal phrases to form a to-be-clustered word set, acquiring a word feature vector of each to-be-clustered word in the to-be-clustered word set, clustering the to-be-clustered word set according to the word feature vector, and determining multiple cluster sets of the original document, each of the nominal phrases being combined by a modifying word and a nominal word;
extracting candidate words from the original document, the extracted candidate words forming a first word set;
acquiring a first association degree between each first word in the first word set and the original document according to the document feature vector and the multiple cluster sets as well as the word feature vector of each first word in the first word set, and determining a second word set according to the first association degree, the second word set being a subset of the first word set;
for each second word in the second word set, inquiring, in a word association topology, at least one node word satisfying a condition of association with the second word, the at least one node word forming a third word set, the word association topology indicating an association relation among multiple node words in a predetermined field;
determining a union set of the second word set and the third word set, acquiring a second association degree between each candidate keyword in the union set and the original document according to the document feature vector and the multiple cluster sets as well as the word feature vector of each candidate keyword in the union set, and selecting, according to the second association degree, at least one candidate keyword from the union set, to form a keyword set of the original document; and
outputting the keyword set of the original document.

2. The method according to claim 1, wherein,
the extracting candidate words from the original document comprises:
extracting, according to a candidate word extraction rule, nominal words or nominal phrases from the original document as candidate words, each of the nominal phrases being combined by a modifying word and a nominal word; and
wherein the candidate word extraction rule is a rule determined according to at least one of the following: number of contained characters, a frequency of occurrence, and a frequency of occurrence of synonyms.

3. The method according to claim 1, wherein,
the first association degree between each first word and the original document or the second association degree between each candidate keyword and the original document is calculated according to formula:

$$S(x, D) = \alpha \cdot Y_{sim}(x, V_0) + \beta \cdot \frac{\sum_{i=1}^{M} Y_{sim}(x, C_i)}{M}$$

where x represents the word feature vector of any first word in the first word set or the word feature vector of any candidate keyword in the union set, $S(x, D)$ represents the first association degree between any first word in the first word set and the original document or the second association degree between any candidate keyword in the union set and the original document, $\alpha$ and $\beta$ are weight coefficients, $Y_{sim}(\ )$ is a similarity function, $V_0$ is the document feature vector, $C_i$ is a cluster feature vector of the $i^{th}$ cluster set, and M is a number of the cluster sets.

4. The method according to claim 1, wherein,
the determining a second word set according to the first association degree comprises:
selecting first words each of which has a first association degree with the original document being greater than a first preset association value, to form the second word set;
or, selecting, in a descending order for first association degrees with the original document, first words preceding a first preset rank, to form the second word set;
or, selecting, in a descending order for first association degrees with the original document, first words located in a first preset proportion part of the order to form the second word set.

5. The method according to claim 1, wherein,
the inquiring, for each second word in the second word set and in a word association topology, at least one node word satisfying a condition of association with the second word comprises:
when the word association topology is an undirected topology, inquiring, in the word association topology, a node word having an association distance to a second word in the second word set being less than a preset distance; and
when the word association topology is a directed topology, inquiring, in the word association topology, a node word having an association distance to a second word in the second word set being within a preset range, the preset range comprising a positive interval and a negative interval.

6. The method according to claim 1, wherein,
the selecting, according to the second association degree and from the union set, at least one candidate keyword to form a keyword set of the original document comprises:
multiplying association degrees between some candidate keywords, from the third word set, in the union set with the original document by a preset coefficient, the preset coefficient being greater than 0.7 and less than 1; and
selecting, from the union set, the at least one keyword in at least one of the following ways:
selecting candidate keywords having the second association degree being greater than a second preset association value;

or, selecting, in a descending order for the second association degrees, candidate keywords preceding a second preset rank;

or, selecting, in a descending order for the second association degrees from the, candidate keywords located in a first second preset proportion part of the order.

7. A keyword extraction apparatus, comprising:
a processor; and
memory storing instructions executable for the processor that, when executed by the processor, causes the processor to:
receive an original document;
extract, from the original document, verbal, nominal or adjective words to form a denoised document;
calculate a document feature vector of the denoised document by using a vector generation model;
select, from the denoised document, nominal words or nominal phrases combined by modifying words and nominal words to form a to-be-clustered word set, acquire a word feature vector of each to-be-clustered word in the to-be-clustered word set, cluster the to-be-clustered word set according to the word feature vector, and determine multiple cluster sets of the original document;
extract candidate words from the original document and form a first word set by using the extracted candidate words;
acquire a first association degree between each first word in the first word set and the original document according to the document feature vector and the multiple cluster sets as well as the word feature vector of each first word in the first word set;
determine a second word set according to the first association degree, the second word set being a subset of the first word set;
for each second word in the second word set, inquire, in a word association topology, at least one node word satisfying a condition of association with the second word, and form a third word set by using the at least one node word, the word association topology indicating an association relation among multiple node words in a predetermined field;
determine a union set of the second word set and the third word set;
acquire a second association degree between each candidate keyword in the union set and the original document according to the document feature vector and the multiple cluster sets as well as the word feature vector of each candidate keyword in the union set;
select, according to the second association degree and from the union set, at least one candidate keyword to form a keyword set of the original document; and
output the keyword set of the original document.

8. The apparatus according to claim 7, wherein the instructions further cause the processor to:
extract, according to a candidate word extraction rule and from the original document, nominal words or nominal phrases combined by modifying words and nominal words as candidate words;
wherein the candidate word extraction rule is a rule determined according to at least one of the following: the number of contained characters, a frequency of occurrence, and a frequency of occurrence of synonyms.

9. The apparatus according to claim 7, wherein the instructions further cause the processor to:
calculate the first association degree between each first word and the original document according to the following formula, and calculate the second association degree between each candidate keyword and the original document according to formula:

$$S(x, D) = \alpha \cdot Y_{sim}(x, V_0) + \beta \cdot \frac{\sum_{i=1}^{M} Y_{sim}(x, C_i)}{M}$$

where x represents the word feature vector of any first word in the first word set or the word feature vector of any candidate keyword in the union set, $S(x, D)$ represents the first association degree between any first word in the first word set and the original document or the second association degree between any candidate keyword in the union set and the original document, $\alpha$ and $\beta$ are weight coefficients, $Y_{sim}(\ )$ is a similarity function, $V_0$ is the document feature vector, $C_i$ is a cluster feature vector of the ith cluster set, and M is a number of the cluster sets.

10. The apparatus according to claim 7, wherein the instructions further cause the processor to:
select first words having a first association degree with the original document being greater than a first preset association value to form the second word set;
or,
select, in a descending order for first association degrees with the original document, first words preceding a first preset rank to form the second word set;
or,
select, in a descending order for first association degrees with the original document, first words located in a first preset proportion part of the order to form the second word set.

11. The apparatus according to claim 7, wherein the instructions further cause the processor to:
when the word association topology is an undirected topology, inquire, in the word association topology, a node word having an association distance to a second word in the second word set being less than a preset distance; and
when the word association topology is a directed topology, inquire, in the word association topology, a node word having an association distance to a second word in the second word set being within a preset range, the preset range comprising an positive interval and a negative interval.

12. The apparatus according to claim 7, wherein the instructions further cause the processor to:
multiply association degrees between some candidate keywords, from the third word set, in the union set with the original document by a preset coefficient, the preset coefficient being greater than 0.7 and less than 1; and
select candidate keywords having the second association degree being greater than a second preset association value;
or,
select, in a descending order for first association degrees with the original document, first words preceding a first preset rank to form the second word set;
or,
select, in a descending order for first association degrees with the original document, first words located in a first preset proportion part of the order to form the second word set.

13. A non-transitory computer-readable storage medium, instructions in the storage medium, when executed by a processor of a mobile terminal, enabling the mobile terminal to execute a keyword extraction method, the method comprising:

receiving an original document;

extracting, from the original document, verbal, nominal or adjective words to form a denoised document;

calculating a document feature vector of the denoised document by using a vector generation model;

selecting, from the denoised document, nominal words or nominal phrases to form a to-be-clustered word set, acquiring a word feature vector of each to-be-clustered word in the to-be-clustered word set, clustering the to-be-clustered word set according to the word feature vector, and determining multiple cluster sets of the original document, each of the nominal phrases being combined by a modifying word and a nominal word;

extracting candidate words from the original document, the extracted candidate words forming a first word set;

acquiring a first association degree between each first word in the first word set and the original document according to the document feature vector and the multiple cluster sets as well as the word feature vector of each first word in the first word set, and determining a second word set according to the first association degree, the second word set being a subset of the first word set;

for each second word in the second word set, inquiring, in a word association topology, at least one node word satisfying a condition of association with the second word, and forming a third word set by using the at least one node word, the word association topology indicating an association relation among multiple node words in a predetermined field;

determining a union set of the second word set and the third word set, acquiring a second association degree between each candidate keyword in the union set and the original document according to the document feature vector and the multiple cluster sets as well as the word feature vector of each candidate keyword in the union set, and selecting, according to the second association degree and from the union set, at least one candidate keyword to form a keyword set of the original document; and outputting the keyword set of the original document.

* * * * *